(12) United States Patent
Romig

(10) Patent No.: US 6,325,396 B1
(45) Date of Patent: Dec. 4, 2001

(54) STEERING ASSEMBLY

(75) Inventor: Bernard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/659,248

(22) Filed: Sep. 11, 2000

(51) Int. Cl.$^7$ .................................................. B60G 1/00
(52) U.S. Cl. .......................... 280/98; 280/103; 280/93.502
(58) Field of Search ........................ 280/98, 103, 124.11, 280/124.111, 124.113, 93.502, 93.51

(56) References Cited

U.S. PATENT DOCUMENTS

| | | | |
|---|---|---|---|
| 2,921,784 | * | 1/1960 | Miller ...................................... 269/17 |
| 3,430,975 | * | 3/1969 | Wolf ....................................... 280/103 |
| 4,212,483 | * | 7/1980 | Howard ................................. 280/444 |
| 5,046,577 | * | 9/1991 | Hurlburt ............................... 180/266 |
| 5,129,477 | * | 7/1992 | Hurlburt ............................... 180/265 |
| 5,312,123 | * | 5/1994 | Hurlburt ................................. 280/97 |
| 5,447,320 | * | 9/1995 | Hurlburt ................................. 280/97 |
| 5,447,321 | * | 9/1995 | Hurlburt et al. ..................... 280/897 |
| 5,636,857 | * | 6/1997 | Tandy, Jr. et al. ................... 280/692 |
| 5,851,015 | * | 12/1998 | Klosterhaus ....................... 280/93.51 |
| 5,964,308 | * | 10/1999 | Miyamoto ............................. 180/8.3 |

OTHER PUBLICATIONS

Chicurel, "A 180° steering interval mechanism", Mechanism and Machine Theory 34, 1997.

* cited by examiner

*Primary Examiner*—Paul N. Dickson
*Assistant Examiner*—Faye M. Fleming

(57) ABSTRACT

A vehicle steering assembly includes steerable wheels mounted on half fork members which are pivotally coupled the outer ends of an axle member. A rack and pinion assembly is attached to the axle member and has an input shaft coupled to a steering wheel, and a laterally movable rack member. The outer ends of the rack member are pivotally coupled via a vertical pivot pin to one end of a corresponding tie rod member. The other end of each tie rod member is pivotally coupled to one end of a connecting rod and to one end of a rocker arm. The other end of each connecting rod is pivotally coupled to a corresponding half fork member. The other end of each rocker arm is pivotally coupled to a corresponding outer end of the axle member.

10 Claims, 3 Drawing Sheets

STEERING ASSEMBLY

BACKGROUND OF THE INVENTION

The invention relates to a steering wheel assembly for a vehicle, and more particularly, to a steering wheel assembly for a vehicle with a zero turning radius (ZTR).

Zero turn radius vehicles, such as lawn mowers and windrowers, have relied on caster wheels and some form of independent control of the drive wheels for steering. Such designs can result in poor directional control when traversing side slopes and can limit the usability of the vehicle. Ackerman-type steering mechanisms provide good directional control, but do not normally allow wheels to be turned through a 180° range. A steering mechanism with Ackerman-type geometry and capable of turning wheels through a 180° range is described by E. Chicurel in "Mechanism and Machine Theory", Vol. 34 No. 3 April 1999. However, the E. Chicurel mechanism is complex and requires a gear or chain drive mechanical amplifier.

SUMMARY OF THE INVENTION

Accordingly, an object of this invention is to provide a steering mechanism which is capable of turning wheels through a 180° range.

A further object of the invention is to provide such a steering mechanism which has Ackerman-type geometry.

Another object of the invention is to provide such a steering mechanism which does not require a gear or chain drive mechanical amplifier.

These and other objects are achieved by the present invention, wherein a vehicle steering assembly includes steerable wheels mounted on half fork members which are pivotally coupled to the outer ends of an axle member. A rack and pinion assembly is attached to the axle member and has an input shaft for coupling to a steering wheel, and has a laterally movable rack member, with a vertical pivot pin attached at each end thereof. A pair of tie rod members each has an end coupled to the corresponding pivot pin. A pair of rocker arm members each has a first end pivotally coupled to a second end of the corresponding tie rod member, and has a second end pivotally coupled to a corresponding end of the axle beam. A pair of connecting rods each has a first end pivotally coupled to the first end of the corresponding rocker arm, and has a second end which is pivotally coupled to the upper arm of the corresponding half fork member.

DESCRIPTION OF THE PREFERRED EMBODIMENT

Figure 1:
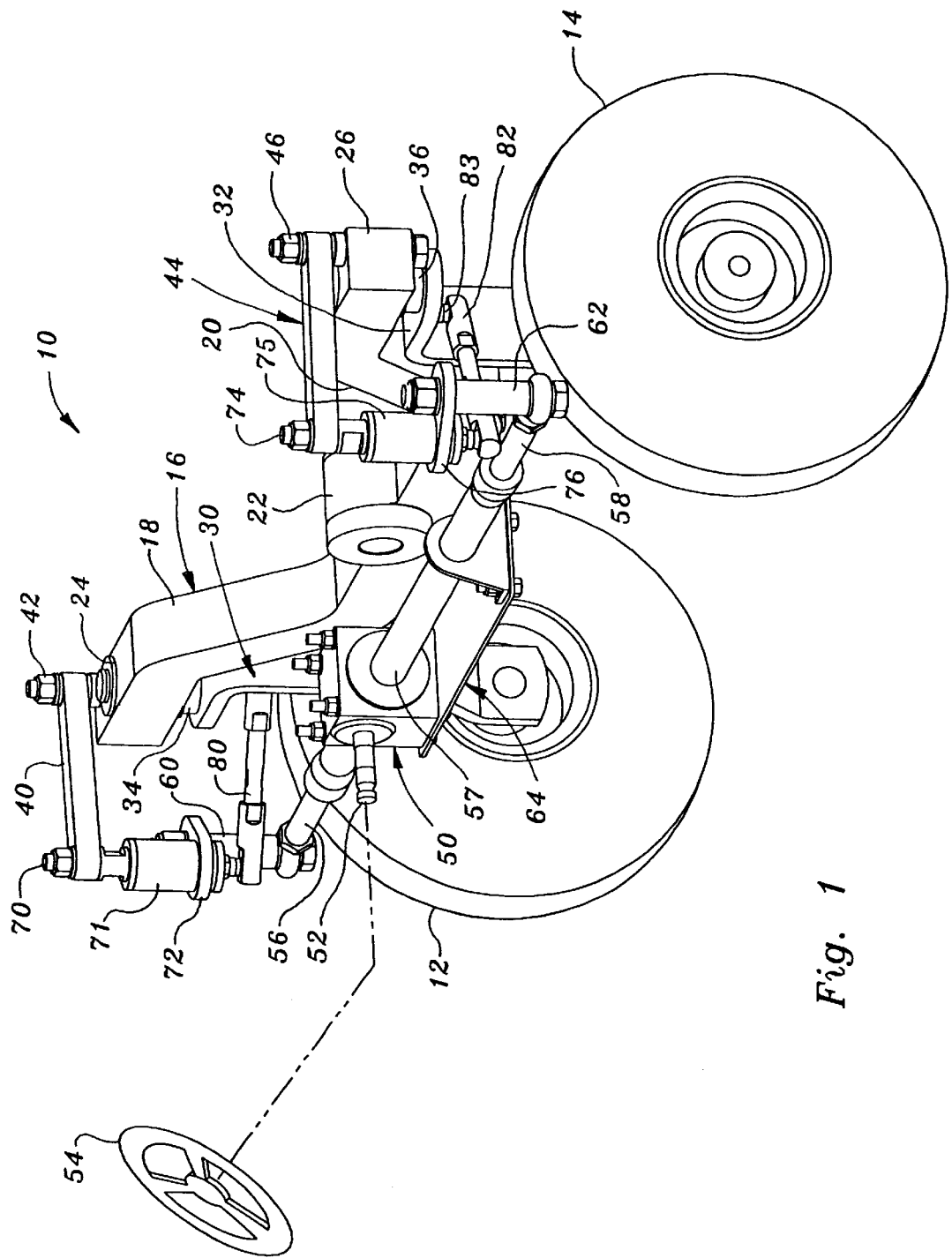
FIG. 1 is a perspective view of a steering assembly according to the present invention.
Figure 2:
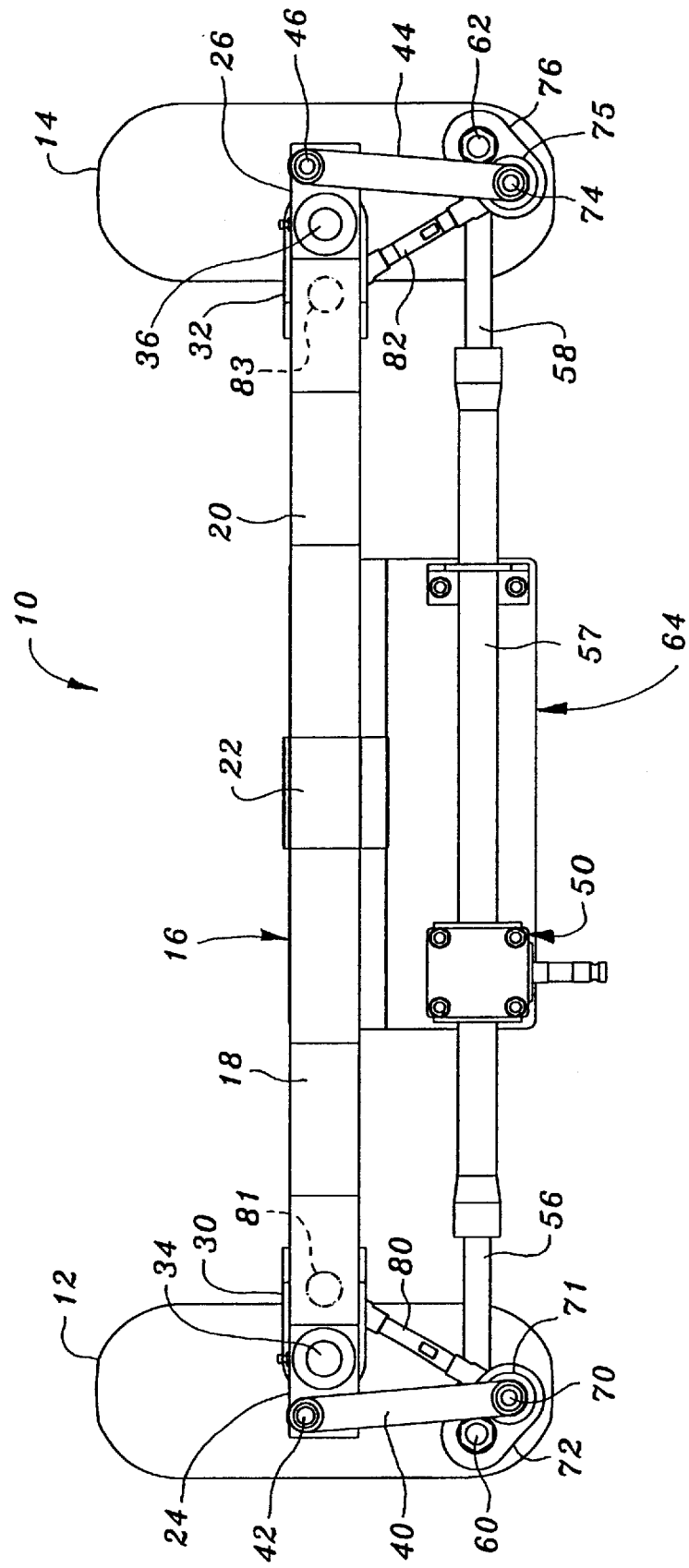
FIG. 2 is a top view of the steering assembly of FIG. 1.
Figure 3:
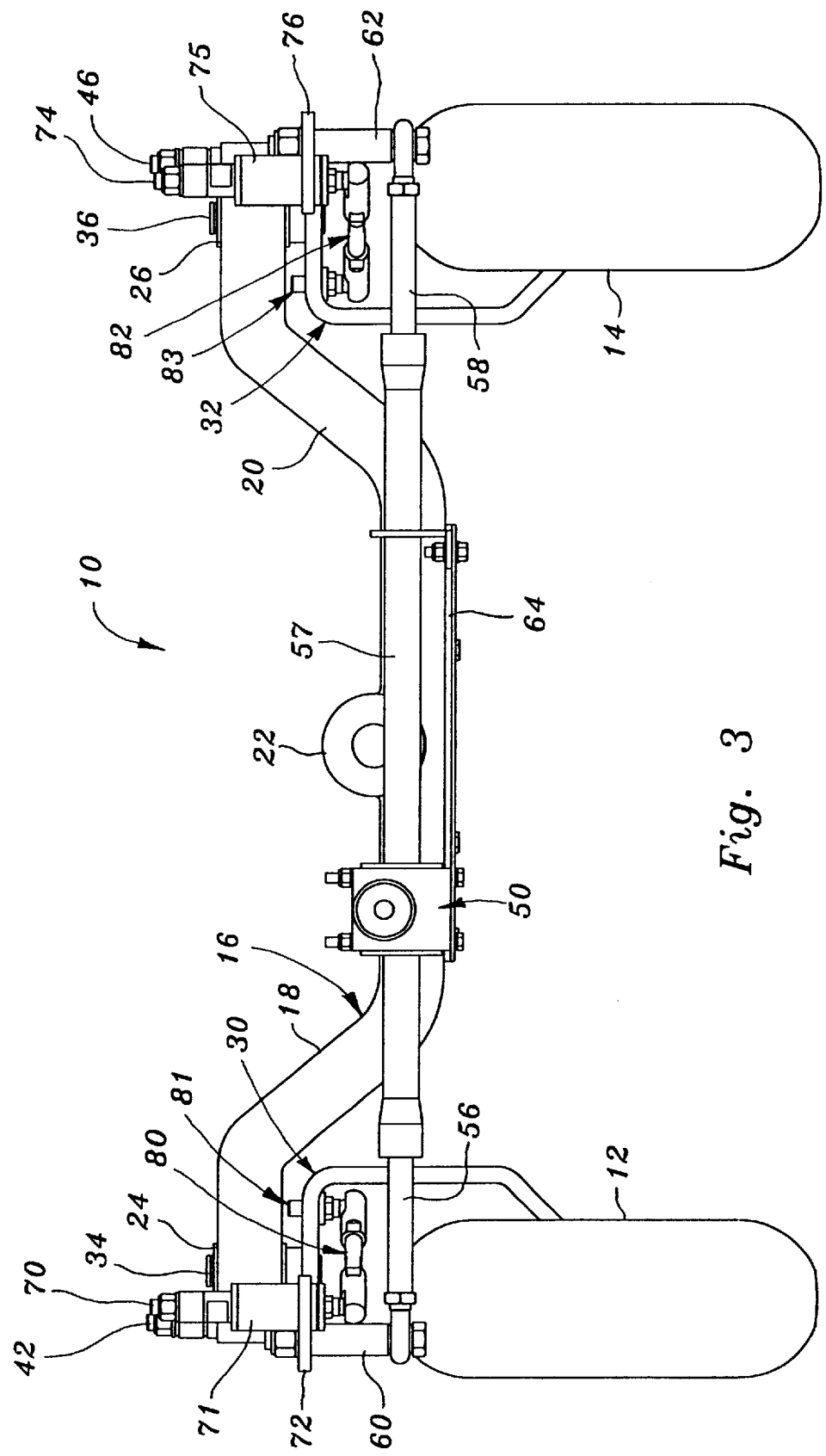
FIG. 3 is an end view, from rear to front, of the steering assembly of FIG. 1.

Referring to FIGS. 1–3, a steering assembly 10 is provided for the steerable front wheels 12 and 14 of a vehicle, such as a lawn mower, windrower, etc. The assembly 10 includes an axle beam 16 which has a left arm 18 and a right arm 20 which project outwardly from a center pivot member 22 which is pivotal about a central fore-and-aft extending axis.

The left and right front wheels 12, 14 are rotatably coupled to the lower ends of respective, generally C-shaped, left and right half fork members 30 and 32. Each half fork member has a pivot pin 34, 36 which projects upwardly from an upper end thereto. Pin 34 is pivotally received in a bore in the outer end 24 of left arm 18. Pin 36 is pivotally received in a bore in the outer end 26 of right arm 20.

A left rocker arm 40 is pivotal about a pivot pin 42 which is fixedly mounted in a bore in the outer end 24 of left arm 18, and positioned forward and laterally outwardly with respect to pin 34. A right rocker arm 44 is pivotal about a pivot pin 46 which is fixed in a bore in the outer end 26 of right arm 20, and positioned forward and laterally outwardly with respect to pin 36.

A conventional rack and pinion assembly 50 is attached to the axle beam 16 and includes a steering input shaft 52 which is coupled to a steering wheel 54 of the vehicle. A rack member (not shown) is slidable in a fixed housing 57 and has left and right rack end members 56 and 58 which project laterally outwardly from opposite ends of the housing 57. A left vertical pivot pin 60 has a lower end which is pivotally attached to the left end 56 of the rack member, and a right vertical pivot pin 62 has a lower end which is pivotally attached to the right end 58 of the rack member. A support bracket 64 supports the rack housing 57 and is attached to the axle beam 16.

Left rocker arm 40 is fixed to an upper end of a pivot pin 70 which pivotally supports, via bushings (not shown), a sleeve 71 which is fixed to an end of pivot link 72. Right rocker arm 44 is fixed to an upper end of a pivot pin 74 which pivotally supports, via bushings (not shown), a sleeve 75 which is fixed to an end of a pivot link or tie rod member 76. The upper end of left vertical pivot pin 60 is fixed to the other end of pivot link 72. The upper end of vertical pivot pin 62 is fixed to the other end of pivot link or tie rod member 76.

A left connecting rod 80 has one end pivotally coupled to the lower end of pin 70 via a ball joint (not shown) and another end pivotally coupled to the upper end of left half fork member 30 by pin 81. A right connecting rod 82 hat one end pivotally coupled to the lower end of pin 74 via a ball joint (not shown) and another end pivotally coupled to the upper end of right half fork member 32 by pin 83. As best seen in FIG. 3, each of the pins 81,83 is inboard with respect to the corresponding one of pivot pins 34,36.

As best seen in FIG. 2, when the wheels 12,14 are oriented straight ahead, pin 70 is inboard and to the rear of pin 60, and pin 74 is inboard and to the rear of pin 62.

Preferably, the displacement of the rack (not shown) of steering assembly 10 is made proportional to a commanded steering angle, which is the angle through which a hypothetical center front wheel would need to be turned to cause a tricycle to follow the same turning radius.

While the present invention has been described in conjunction with a specific embodiment, it is understood that many alternatives, modifications and variations will be apparent to those skilled in the art in light of the foregoing description. For example, the invention is applicable to vehicles with driven front wheels and steerable rear wheels. Accordingly, this invention is intended to embrace all such alternatives, modifications and variations which fall within the spirit and scope of the appended claims.

What is claimed is:

1. A vehicle steering assembly for steering a pair of steerable wheels, comprising:

an axle member having left and right outer ends;

a pair of half fork members, each having an upper end pivotally coupled to a corresponding outer end of the axle member, and having a lower end for rotatably supporting a corresponding steerable wheel;

a laterally movable steering member having left and right outer ends;

a pair of tie rod members, each having a first end pivotally coupled to a corresponding end of the steering member, and having a second end;

a pair of rocker arm members, each having a first end pivotally coupled to the second end of a corresponding tie rod member, and each having a second end pivotally coupled to a corresponding outer end of the axle member; and a pair of connecting rods, each having a first end which is pivotally coupled to the first end of a corresponding rocker arm members, and each having a second end which is pivotally coupled to the upper end of a corresponding one of the half fork members.

2. The steering assembly of claim 1, wherein:

each half fork member has a pivot pin which projects upwardly therefrom and which is pivotally received by the corresponding outer end of the axle member; and each rocker arm is pivotally coupled to a pivot pin which projects downwardly therefrom and which is fixedly received by the outer end of the axle member, the rocker arm pivot pin being positioned outwardly and forward with respect to the half fork member pivot pin.

3. The steering assembly of claim 1, further comprising:

a pair of pivot shafts, each having an inner shaft rotatably supporting an outer sleeve, each inner shaft having a lower end pivotally coupled to the first end of a corresponding connecting rod, and an upper end fixed to the first end of a corresponding rocker arm, each outer sleeve being fixed to the second end of a corresponding tie rod member.

4. The steering assembly of claim 1, further comprising:

a pair of connecting pins, each being pivotally coupled to a corresponding outer end of the steering member, and each being fixed to the first end of a corresponding tie rod member.

5. The steering assembly of claim 1, wherein:

each half fork member is pivotal with respect to the axle member about a first axis; and the second end of each connecting rod is pivotally connected to the corresponding half fork member about a second pivot axis which is inboard with respect to the first pivot axis.

6. A vehicle steering assembly for steering a pair of steerable wheels, comprising:

an axle member having left and right outer ends;

a pair of half fork members, each having an upper end pivotally coupled to a corresponding outer end of the axle member, and having a lower end for rotatably supporting a corresponding steerable wheel, each half fork member having a pivot pin which projects upwardly therefrom and which is pivotally received by the corresponding outer end of the axle member;

a laterally movable steering member having left and right outer ends;

a pair of tie rod members, each having a first end pivotally coupled to a corresponding end of the steering member, and having a second end;

a pair of rocker arm members, each having a first end pivotally coupled to the second end of a corresponding tie rod member, and each having a second end pivotally coupled to a corresponding rocker arm pivot pin which is fixedly mounted in an outer end of the axle member, the rocker arm pivot pin being positioned outwardly and forward with respect to the half fork member pivot pin;

a pair of connecting rods, each having a first end which is pivotally coupled to the first end of a corresponding rocker arm member, and each having a second end which is pivotally coupled to the upper end of a corresponding one of the half fork members; and a pair of pivot shafts, each being pivotally coupled to the first end of a corresponding connecting rod, each being pivotally coupled to the second end of a corresponding tie rod member, and each being fixed to the first end of a corresponding rocker arm.

7. The steering assembly of claim 6, further comprising:

a pair of connecting pins, each being pivotally coupled to a corresponding outer end of the steering member, and each being coupled to the first end of a corresponding tie rod member.

8. The steering assembly of claim 6, wherein:

each half fork member, is pivotal with respect to the axle member about a first axis; and the second end of each connecting rod is pivotally connected to the corresponding half fork member about a second pivot axis which is inboard with respect to the first pivot axis.

9. A vehicle steering assembly for steering a pair of steerable wheels, comprising:

an axle member having left and right outer ends;

a pair of half fork members, each having an upper end pivotally coupled to a corresponding outer end of the axle member, and having a lower end for rotatably supporting a corresponding steerable wheel;

a laterally movable steering member having left and right outer ends;

a pair of tie rod members, each having a first end pivotally coupled to a corresponding end of the steering member, and having a second end;

a pair of rocker arm members, each having a first end pivotally coupled to the second end of a corresponding tie rod member, and each having a second end pivotally coupled to a corresponding outer end of the axle member;

a pair of connecting rods, each having a first end which is pivotally coupled to the first end of a corresponding rocker arm members, and each having a second end which is pivotally coupled to the upper end of a corresponding one of the half fork member;

a pair of pivot shafts, each being pivotally coupled to the first end of a corresponding connecting rod, each being pivotally coupled to the second end of a corresponding tie rod member, and each being coupled to the first end of a corresponding rocker arm; and a pair of connecting pins, each being pivotally coupled to a corresponding outer end of the steering member, and each being coupled to the first end of a corresponding tie rod member.

10. The steering assembly of claim 9, wherein:

each half fork member, is pivotal with respect to the axle member about a first axis; and the second end of each connecting rod is pivotally connected to the corresponding half fork member about a second pivot axis which is inboard with respect to the first pivot axis.

* * * * *